(12) United States Patent
Ohtomo

(10) Patent No.: US 7,948,459 B2
(45) Date of Patent: May 24, 2011

(54) DISPLAY DEVICE AND INSPECTION METHOD FOR DISPLAY DEVICE

(75) Inventor: Tetsuya Ohtomo, Kanazawa (JP)

(73) Assignee: Toshiba Matsushita Displays Technology Co., Ltd., Tokyo (JP)

( * ) Notice: Subject to any disclaimer, the term of this patent is extended or adjusted under 35 U.S.C. 154(b) by 935 days.

(21) Appl. No.: 11/773,658

(22) Filed: Jul. 5, 2007

(65) Prior Publication Data

US 2008/0123012 A1  May 29, 2008

(30) Foreign Application Priority Data

Jul. 7, 2006  (JP) ................................. 2006-188464

(51) Int. Cl.
*G09G 3/36* (2006.01)

(52) U.S. Cl. ................ 345/87; 345/55; 345/93; 345/96; 345/98; 345/100

(58) Field of Classification Search .......... 345/204–215, 345/55, 87–100; 324/50, 770
See application file for complete search history.

(56) References Cited

U.S. PATENT DOCUMENTS 6,392,622 B1 * 5/2002 Ozawa ............................ 345/92
6,525,556 B2 * 2/2003 Matsueda ...................... 324/770
6,670,953 B1 * 12/2003 Ozawa ........................... 345/211
2007/0296453 A1  12/2007 Ootaguro et al.

FOREIGN PATENT DOCUMENTS

JP           2001-13892        1/2001

\* cited by examiner

*Primary Examiner* — Vijay Shankar
(74) *Attorney, Agent, or Firm* — Oblon, Spivak, McClelland, Maier & Neustadt, L.L.P.

(57) ABSTRACT

A display device includes scanning lines disposed along rows of display pixels, signal lines disposed along columns of the display pixels, pixel switches disposed near intersections between the scanning lines and the signal lines, pixel electrodes connected to the pixel switches, a counter-electrode disposed to be opposed to the pixel electrodes, storage capacitance lines disposed substantially parallel to the scanning lines, first inspection switches connected to the scanning lines in a peripheral section, second inspection switches connected to the signal lines in the peripheral section, a first wiring line which supplies a signal for turning on/off the first inspection switches, a second wiring line which supplies a signal for turning on/off the second inspection switches, and a third wiring line which applies a signal to the counter-electrode and the storage capacitance lines.

3 Claims, 4 Drawing Sheets

DISPLAY DEVICE AND INSPECTION METHOD FOR DISPLAY DEVICE

CROSS-REFERENCE TO RELATED APPLICATIONS

This application is based upon and claims the benefit of priority from prior Japanese Patent Application No. 2006-188464, filed Jul. 7, 2006, the entire contents of which are incorporated herein by reference.

BACKGROUND OF THE INVENTION

1. Field of the Invention

The present invention relates generally to a display device and an inspection method for the display device, and more particularly to an active-matrix display device.

2. Description of the Related Art

A display device, such as a liquid crystal display device, includes a liquid crystal display panel having a display section and a peripheral section surrounding the display section. The display section is composed of a plurality of display pixels which are arrayed in a matrix. The liquid crystal display panel includes a pair of mutually opposed substrates, i.e. an array substrate and a counter-substrate, and a liquid crystal layer which is held between the paired substrates as a light modulation layer.

The plurality of display pixels have pixel switches for switching input signals on the array substrate. Pixel electrodes are connected to the respective pixel switches, and a counter-electrode, which is opposed to the plural pixel electrodes, is disposed on the counter-substrate. The pixel switches are ON/OFF controlled by signals which are supplied from driving signal sources connected to an outside part of the display section, for example, from driving circuits disposed on the array substrate and a flexible wiring board.

In the prior art, as regards the above-described liquid crystal display panel, a display inspection for inspecting presence/absence of a display defect is performed prior to mounting of the driving circuits and flexible wiring board, which are driving signal sources. There has been proposed a liquid crystal display device including a liquid crystal display panel with an inspection circuit for the display inspection (see Jpn. Pat. Appln. KOKAI Publication No. 2001-13892)

In the above-described conventional liquid crystal display device, however, a display inspection prior to the mounting of the driving signal sources cannot be performed by independently controlling scanning lines and signal lines and, in some cases, inspections according to various conditions of use cannot sufficiently be performed.

BRIEF SUMMARY OF THE INVENTION

The present invention has been made in consideration of the above-described problem, and the object of the invention is to provide a display device and an inspection method for the display device, which can inspect presence/absence of a line defect in a display inspection prior to mounting of driving signal sources, by independently controlling scanning lines and signal lines.

According to a first aspect of the present invention, there is provided a display device including a display section which is composed of a plurality of display pixels arrayed in a matrix, and a peripheral section surrounding the display section, comprising: a plurality of scanning lines disposed along rows of the plurality of display pixels; a plurality of signal lines disposed along columns of the plurality of display pixels; pixel switches disposed near intersections between the scanning lines and the signal lines; pixel electrodes connected to the pixel switches; a counter-electrode disposed to be opposed to the pixel electrodes; storage capacitance lines disposed substantially parallel to the scanning lines; a plurality of first inspection switches connected to the plurality of scanning lines, respectively, in the peripheral section; a plurality of second inspection switches connected to the plurality of signal lines, respectively, in the peripheral section; a first wiring line which supplies a signal for turning on/off the plurality of first inspection switches; a second wiring line which supplies a signal for turning on/off the plurality of second inspection switches; and a third wiring line which applies a signal to the counter-electrode and the storage capacitance lines.

According to a second aspect of the present invention, there is provided an inspection method for a display device for inspecting presence/absence of a line defect in a display section, comprising: supplying a signal for turning on a first inspection switch to a first wiring line, thereby supplying a scanning signal to a scanning line via the first inspection switch; supplying a signal for turning off a second inspection switch to a second wiring line, thereby setting a signal line in a floating state; and supplying a common signal to a third wiring line which applies a signal to a counter electrode and a storage capacitance line.

The present invention can provide a display device and an inspection method for the display device, which can inspect presence/absence of a line defect in a display inspection prior to mounting of driving signal sources, by independently controlling scanning lines and signal lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A display device according to an embodiment of the present invention will now be described with reference to the accompanying drawings. As the display device, a liquid crystal display device is described by way of example. The invention is also applicable to other types of display devices, for example, an organic electroluminescence display device.

Figure 1:
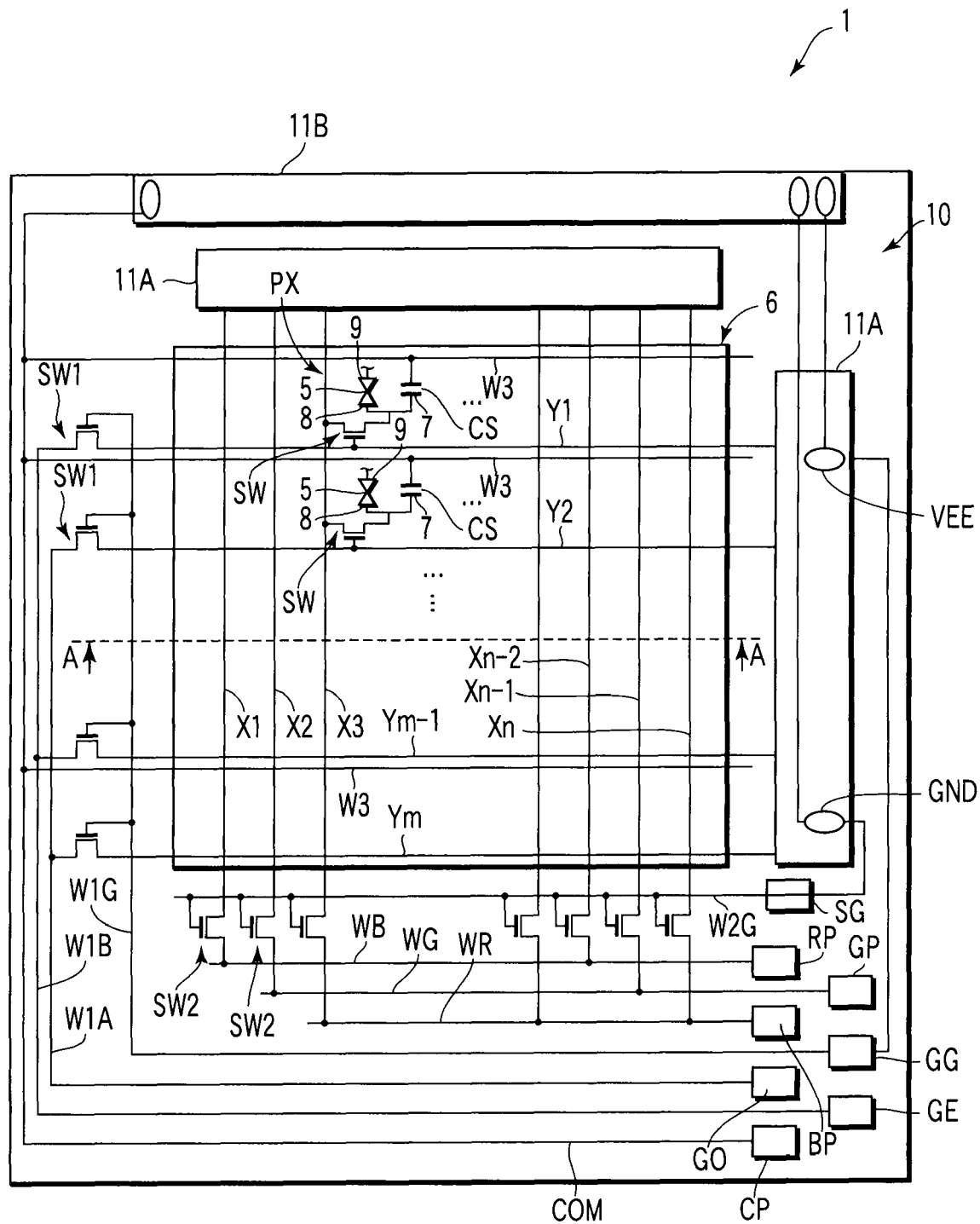
FIG. 1 schematically shows an example of the structure of a liquid crystal display panel of a liquid crystal display device according to an embodiment of the present invention.

As shown in FIG. 1, a liquid crystal display device according to the embodiment of the invention includes a substantially rectangular, flat liquid crystal display panel 1. The liquid crystal display panel 1 includes a substantially rectangular display section 6 which displays an image, and a peripheral section 10 surrounding the display section 6. The display section 6 is composed of a plurality of display pixels PX which are arrayed in a matrix.

Figure 2:
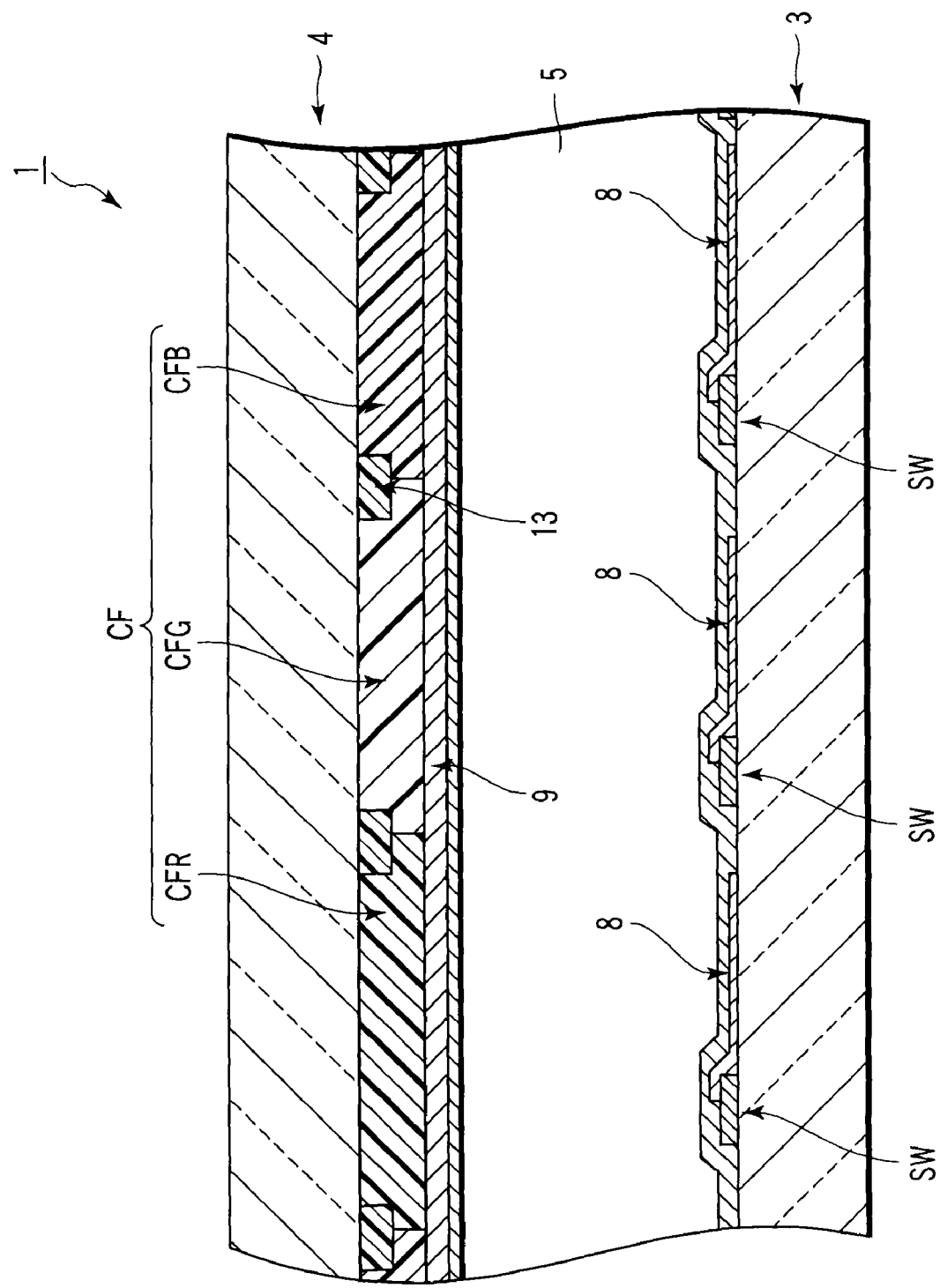
FIG. 2 is a cross-sectional view taken along line A-A in FIG. 1, showing an example of the cross section of the liquid crystal display panel shown in FIG. 1.

As shown in FIG. 2, the liquid crystal display panel 1 includes a pair of mutually opposed substrates, i.e. an array substrate 3 and a counter-substrate 4, and a liquid crystal layer 5 which is held between the paired substrates.

In the display section 6, the array substrate 3 includes scanning lines Y (Y1, Y2, Y3, . . . , Ym) which are disposed along rows of display pixels PX, signal lines X (X1, X2, X3, . . . , Xn) which are disposed along columns of display pixels PX, and storage capacitance lines W3 which extend substantially parallel to the scanning lines Y. In the vicinity of intersections between the scanning lines Y and signal lines X, there are provided pixel switches SW which are disposed in association with the respective display pixels PX, and pixel electrodes 8 and storage capacitance electrodes 7 which are connected to the pixel switches SW.

Each of the pixel switches SW is composed of, e.g. a thin-film transistor (TFT). The pixel switch SW has a gate electrode electrically connected to the associated scanning line Y (or formed integral with the associated scanning line Y). The pixel switch SW has a source electrode electrically connected to the associated signal line X (or formed integral with the associated signal line X). The pixel switch SW has a drain electrode electrically connected to the pixel electrode 8 and storage capacitance electrode 7 of the associated display pixel PX. The storage capacitance electrode 7, together with a part of the storage capacitance line W3, constitutes a storage capacitance Cs.

The counter-substrate 4 includes, in the display section 6, a counter-electrode 9 which is common to all the display pixels PX. The counter-electrode 9 is opposed to all the pixel electrodes 8. The liquid crystal display panel 1 of the liquid crystal display device, which is of a color display type, includes a plurality of kinds of display pixels PX, for example, a red pixel which displays red, a green pixel which displays green, and a blue pixel which displays blue.

Specifically, the red pixel includes a red color filter CFR which is formed of a colored resin that passes light of a major wavelength of red. The green pixel includes a green color filter CFG which is formed of a colored resin that passes light of a major wavelength of green. The blue pixel includes a blue color filter CFB which is formed of a colored resin that passes light of a major wavelength of blue. A color filter layer CF comprising the color filters CFR, CFG and CFB is disposed on that major surface of the counter-substrate 4 in the display section 6, which is located on the liquid crystal layer 5 side.

A light-blocking layer 13 is formed between the respective color filters CFR, CFG and CFB (i.e. between display pixels PX) and on a region surrounding the display section 6. The light-blocking layer 13, which is formed between the color filters CFR, CFG and CFB, is disposed so as to be opposed to the signal lines X and scanning lines Y on the array substrate 3. The light-blocking layer 13 is formed of, e.g. a color resin which is colored in black.

The array substrate 3 and counter-substrate 4 are disposed in the state in which the pixel electrodes 8 of all display pixels PX are opposed to the counter-electrode 9, and a gap is provided between the array substrate 3 and counter-substrate 4. The liquid crystal layer 5 is formed of a liquid crystal composition which is sealed in the gap between the array substrate 3 and counter-substrate 4.

The peripheral section 10 of the liquid crystal display panel 1 includes a connection section 11 to which driving signal sources for driving the display pixels PX are connected. The connection section 11 includes first connection regions 11A to which driving circuits functioning as driving signal sources are connectable, and a second connection region 11B to which a flexible wiring board (FPC) functioning as a driving signal source is connectable.

A signal driving circuit (not shown), to which all signal lines X are connected, and a scanning line driving circuit (not shown), to which all scanning lines Y are connected, are disposed on the first connection regions 11A. The scanning line driving circuit successively drives the scanning lines Y, and turn on the pixel switches SW which are connected to the driven scanning line Y. The signal line driving circuit successively drives the signal lines X, and supplies via the pixel switches SW image signals to the pixel electrodes 8 on the row corresponding to the driven scanning line Y. The flexible wiring board supplies control signals, etc. to the driving circuits, etc. on the array substrate 3.

Further, first inspection switches SW1, which are connected to the scanning lines Y, and second inspection switches SW2, which are connected to the signal lines X, are disposed on the peripheral section 10. A first wiring line W1G for supplying a control signal for turning on/off the first inspection switches SW1 is connected to the gate electrode of each of the first inspection switches SW1. The first wiring line W1G is common to the plural first inspection switches SW1 and supplies the control signal to each first inspection switch SW1. The first wiring line W1G is connected to an inspection pad GG to which a control signal is supplied from an inspection apparatus.

The source electrode of each first inspection switch SW1 is connected to an inspection wiring line W1A, W1B. The inspection wiring lines W1A, W1B supply inspection signals to the scanning lines Y via the first inspection switches SW1. In the present embodiment, neighboring first inspection switches SW1 are connected to different inspection lines W1A and W1B. Specifically, the source electrodes of the first inspection switches SW1, which are connected to odd-numbered scanning lines Y (Y1, Y3, . . . ), are connected to the inspection wiring line W1A. The source electrodes of the first inspection switches SW1, which are connected to even-numbered scanning lines Y (Y2, Y4, . . . ), are connected to the inspection wiring line W1B.

The inspection wiring line W1A is connected to an inspection pad GO to which an inspection signal is supplied from the inspection apparatus. The inspection wiring line W1B is connected to an inspection pad GE which receives an inspection signal from the inspection apparatus.

The drain electrode of each of the first inspection switches SW1 is connected to the associated scanning line Y. Thus, if a signal which turns on the first inspection switch SW1 is supplied to the first wiring line W1G, the inspection signal, which is supplied to the inspection wiring line W1A, W1B, is supplied to the scanning line Y via the first inspection switch SW1.

The gate electrode of each of the second inspection switches SW2 is connected to a second wiring line W2G. The second wiring line W2G functions to supply a control signal for turning on/off the second inspection switches SW2. The second wiring lines W2G is common to the plural second inspection switches SW2, and supplies a control signal to each second inspection switch SW2. The second wiring line W2G is connected to an inspection pad SG which receives the control signal from the inspection apparatus.

The source of each of the second inspection switches SW2 is connected to an inspection line for supplying an inspection signal.

Specifically, the source electrode of the second inspection switch SW, which is connected to the signal line X that supplies an image signal to the red pixel, is connected to an inspection line WR. The source electrode of the second inspection switch SW, which is connected to the signal line X that supplies an image signal to the green pixel, is connected to an inspection line WG. The source electrode of the second inspection switch SW, which is connected to the signal line X that supplies an image signal to the blue pixel, is connected to an inspection line WB. The inspection lines WR, WG and WB are connected, respectively, to inspection pads RP, GP, BP for receiving inspection signals from the inspection apparatus.

The drain electrode of each of the second inspection switches SW2 is connected to the associated signal line X. Thus, if a signal which turns on the second inspection switch SW2 is supplied to the second wiring line W2G, the inspection signal that is supplied to the inspection wiring line WR, WG, WB is supplied to the signal line X via the second inspection switch SW2.

A common wiring line COM is disposed on the peripheral section 10 as a third wiring line for applying a predetermined common signal to the counter-electrode 9 and storage capacitance lines W3. The common wiring line COM is connected to an inspection pad CP for applying an inspection signal to the counter-electrode 9 from the inspection apparatus.

With the above-described structure, the first inspection switches connected to the scanning lines and the second inspection switches connected to the signal lines can independently be turned on/off, and a display inspection can be performed by independently controlling the scanning lines and signal lines. Thus, inspections according to various conditions of use can be performed. The inspection method, which is applicable with the adoption of the above-described structure, will be described below.

An inspection method for inspecting presence/absence of a line defect in the display section is described. Specifically, probes of an inspection apparatus are connected to the individual inspection pads, and inspection signals are supplied from the inspection apparatus. At this time, to start with, a control signal for turning on the first inspection switches SW1 is supplied from the inspection pad GG, and an inspection signal is supplied from the inspection pad GO, GE. This inspection signal corresponds to a scanning signal which turns on the associated pixel switch, and is supplied to the scanning line Y via the first inspection switch. In addition, a common signal is supplied from the inspection pad CP to the counter-electrode 9 and storage capacitance lines W3. At this time, a control signal for turning off the second switches SW2 is input to the inspection pad SG, thereby setting the signal lines X in a floating state.

In this state, presence/absence of a line defect in the display section is inspected. In a case where a line defect occurs in this state, some causes, which are explained below, are thinkable.

Figure 3:
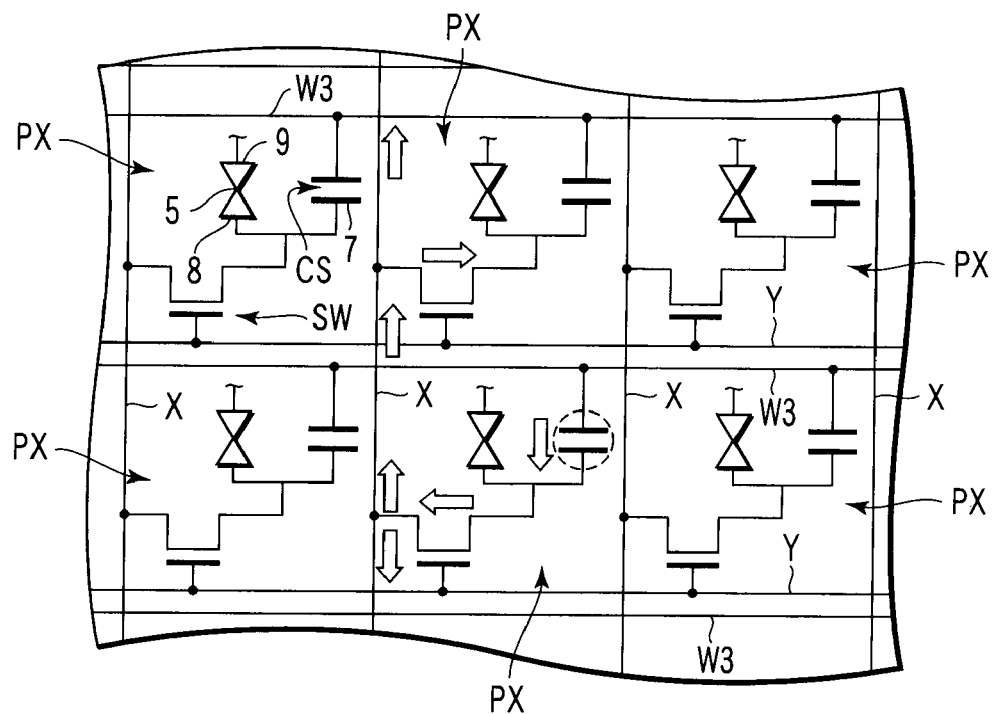
FIG. 3 is a view for describing a method of a display inspection of the liquid crystal display device according to the embodiment.

For example, if short-circuit occurs between the storage capacitance electrode 7 and storage capacitance line W3 in a part circled by a broken line in FIG. 3, a leak current occurs in the signal line X via the pixel switch SW to which the storage capacitance electrode 7 that is short-circuited is connected.

In this case, the potential of the pixel electrode 8 varies via the pixel switch SW which is disposed on the row corresponding to the signal line X in which the leak current has occurred. As a result, a line-shaped display defect (line defect) occurs along the display pixel PX which is disposed on the row corresponding to the signal line X in which the leak current has occurred.

Figure 4:
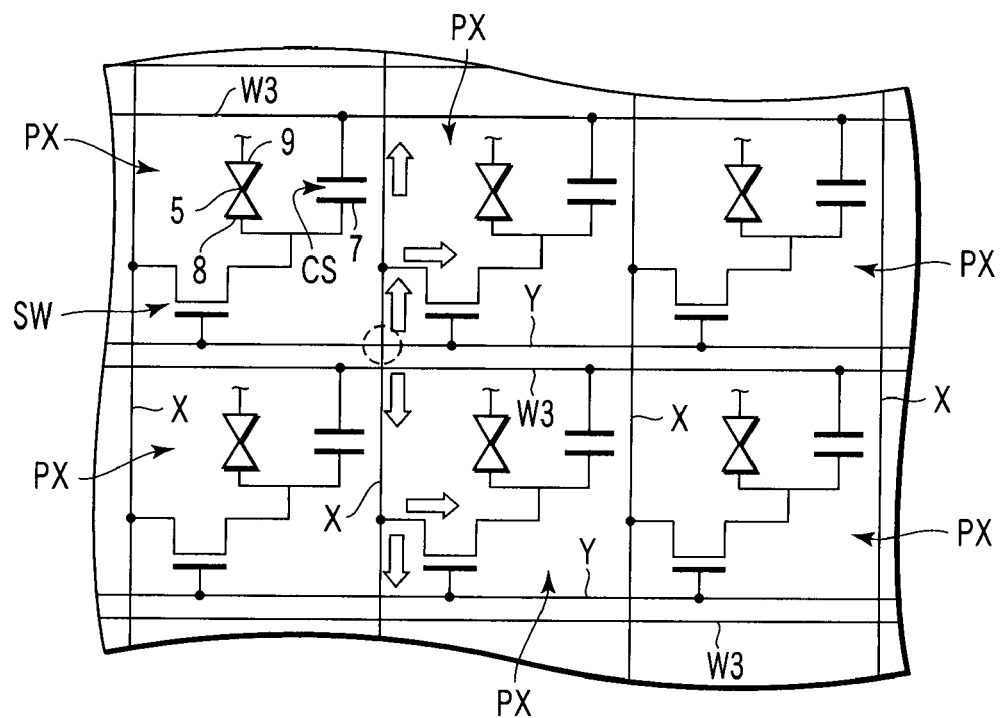
FIG. 4 is a view for describing the method of the display inspection of the liquid crystal display device according to the embodiment.

In addition, for example, if short-circuit occurs between the scanning line Y and signal line X in a part circled by a broken line in FIG. 4, a leak current occurs in the signal line X due to the inspection signal that is applied to the scanning line Y. Then, the potential of the pixel electrode 8 varies via the pixel switch SW which is connected to the signal line X. As a result, a line-shaped display defect (line defect) occurs due to the display pixel PX which is connected to the signal line X in which the leak current has occurred.

By performing the inspection as described above, it becomes possible to inspect presence/absence of a line defect due to short-circuit between the storage capacitance electrode 7 and storage capacitance line W3 or short-circuit between the scanning line Y and signal line X.

The first wiring line W1G is connected to a first electrode on the array substrate 3, to which a signal that turns off the first inspection switches SW1 is applied via the inspection pad GG. The second wiring line W2G is connected to a second electrode on the array substrate 3, to which a signal that turns off the second inspection switches SW2 is applied via the inspection pad SG. In the present embodiment, the first electrode corresponds to an electrode VEE in the first connection region 11A, to which a voltage that turns off the pixel switches SW1 is applied, and the electrode VEE is connected to the first wiring line W1G via the inspection pad GG. The second electrode corresponds to an electrode GND in the first connection region 11A, which provides a ground potential, and the electrode GND is connected to the second wiring line W2G via the inspection pad SG.

The electrode GND and electrode VEE are connected to predetermined electrodes in the second connection region 11B. Specifically, after the driving signal sources are mounted, a ground potential and a voltage for turning off the pixel switches are applied to the electrode GND and electrode VEE via the flexible wiring board.

As described above, the inspection pad GG, to which the first wiring line W1G is connected, and the inspection pad SG, to which the second wiring line W2G is connected, are connected to the different electrodes. Thereby, after the mounting of the driving circuits, etc., the first inspection switches SW1 and second inspection switches SW2 can be kept in the OFF state.

Next, another example of the structure of the liquid crystal display panel of the liquid crystal display device according to the present embodiment is described. In the description below, the structural parts common to those of the liquid crystal display panel shown in FIG. 1 and FIG. 2 are denoted by like reference numerals, and a description thereof is omitted.

Figure 5:
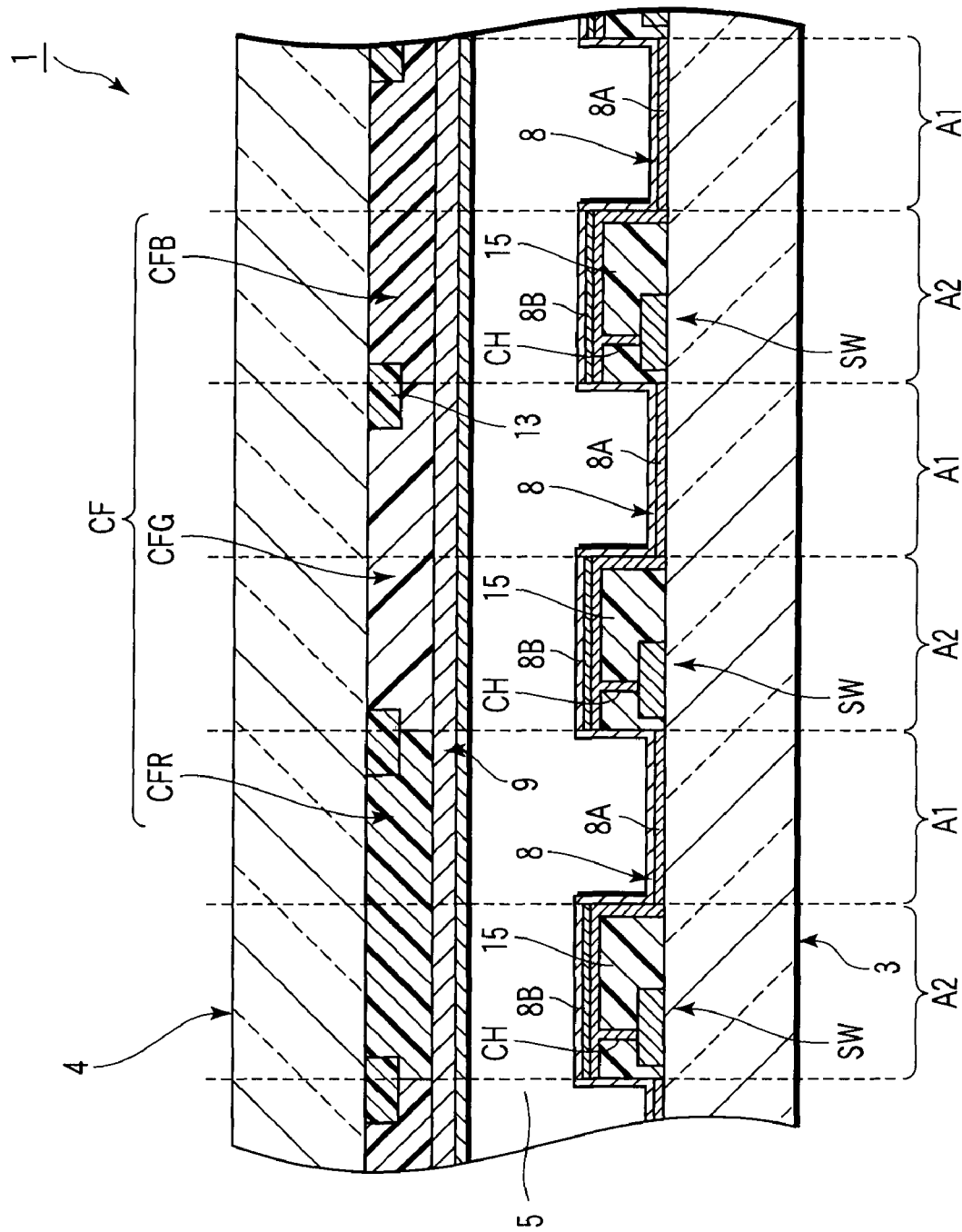
FIG. 5 schematically shows another example of the structure of the liquid crystal display panel of the liquid crystal display device according to the embodiment.

As shown in FIG. 5, the liquid crystal display panel 1 in this example is a transflective liquid crystal display panel. Specifically, the liquid crystal display panel 1 includes a transmissive display area A1 and a reflective display area A2 in the display section 6. The array substrate 3 includes a resin layer 15 for making the thickness of the liquid crystal layer 5 different between the transmissive display area A1 and reflective display area A2. The resin layer 15 is disposed on the pixel switch SW in the reflective display area A2. By the presence of the resin layer 15, the thickness of the liquid crystal layer 5 in the reflective display area A2 is set at about half the thickness of the liquid crystal layer 5 in the transmissive display area A1.

The pixel electrode 8 includes a transparent electrode 8A which is disposed over the transmissive display area A1 and reflective display area A2, and a reflective electrode 8B which is disposed in the reflective display region A2. The transparent electrode 8A is put in contact with the pixel switch SW via a contact hole CH which is formed in the resin layer 15. The reflective electrode 8B is disposed on the transparent electrode 8A.

After the mounting of the driving signal sources, an image is displayed in the transmissive display area A1 by transmissive light that is emitted from a backlight (not shown). In the reflective display area A2, an image is displayed by reflective light of ambient light that enters the display section 6 from the front surface of the liquid crystal display panel 1. Specifically, in the transmissive display area A1, even if a line defect is present, such a line defect is invisible when no light is emitted from the backlight. However, in the reflective display area A2, such a line defect is visible by reflective light, regardless of presence/absence of transmissive light from the backlight. Thus, there is a high necessity for an inspection of the display device according to the embodiment.

By applying the inspection method for the display device according to the embodiment to the above-described transflective liquid crystal display panel, it become possible to inspect presence/absence of a line defect due to short-circuit between the storage capacitance electrode 7 and storage capacitance line W3 or short-circuit between the scanning line Y and signal line X, and, in particular, presence/absence of a line defect occurring when the backlight is in the OFF state.

The present embodiment can provide a display device and an inspection method for the display device, which can inspect presence/absence of a line defect in a display inspection prior to mounting of driving signal sources, by independently controlling scanning lines and signal lines.

Since the source electrodes of the first inspection switches SW1, which are connected to even-numbered scanning lines Y, and the source electrodes of the first inspection switches SW1, which are connected to odd-numbered scanning lines Y, are connected to the different inspection wiring lines W1A and W1B, it is possible to inspect presence/absence of short-circuit between neighboring scanning lines Y.

Furthermore, since the source electrodes of the second inspection switches SW2, which are connected to the respective color pixels, are connected to different inspection wiring lines WR, WG and WB, it is possible to perform display inspections for the individual colors in the color-display-type liquid crystal display panel 1.

The present invention is not limited directly to the above-described embodiments. In practice, the structural elements can be modified without departing from the spirit of the invention.

Various inventions can be made by properly combining the structural elements disclosed in the embodiments. For example, some structural elements may be omitted from all the structural elements disclosed in the embodiments. Furthermore, structural elements in different embodiments may properly be combined.

For example, in the liquid crystal display device according to the embodiment, the first inspection wiring line W1G and second inspection wiring line W2G are connected to the electrodes in the first connection region 11A, to which the signals for turning off the first inspection switches SW1 and second inspection switches SW2 are applied. Alternatively, the first inspection wiring line W1G and second inspection wiring line W2G may be connected to electrodes in the second connection region 11B or to electrodes disposed on the peripheral section 10, if these electrodes are supplied with signals for turning off the first inspection switches SW1 and second inspection switches SW2.

In the liquid crystal display device according to the embodiment, the first wiring line W1G is connected to the VEE electrode, and the second wiring line W2G is connected to the GND electrode. Alternatively, the first wiring line W1G and second wiring line W2G may be connected to other electrodes, if signals for turning off the first inspection switches SW1 and second inspection switches SW2 are supplied from these electrodes to the first wiring line W1G and second wiring line W2G after the driving signal sources are mounted. With this modification, the same advantageous effects as with the above-described embodiment can be obtained.

What is claimed is:

1. A display device including a display section having a plurality of display pixels arrayed in a matrix, and a peripheral section surrounding the display section, comprising:
    a plurality of scanning lines disposed along rows of the plurality of display pixels;
    a plurality of signal lines disposed along columns of the plurality of display pixels;
    a plurality of pixel switches disposed near intersections between the plurality of scanning lines and the plurality of signal lines;
    a plurality of pixel electrodes connected to the plurality of pixel switches;
    a counter-electrode disposed to be opposed to the plurality of pixel electrodes;
    a plurality of storage capacitance lines disposed substantially parallel to the plurality of scanning lines;
    a plurality of first inspection switches connected to the plurality of scanning lines, respectively, in the peripheral section;
    a plurality of second inspection switches connected to the plurality of signal lines, respectively, in the peripheral section;
    a first wiring line configured to supply a signal for turning on/off the plurality of first inspection switches and connected between the gate electrode of each of the first inspection switches and a first electrode;
    a first plurality of wiring lines configured to connect between the source electrodes of the first inspection switches and a first plurality of pads to which an inspection signal is supplied;
    a second wiring line configured to supply a signal for turning on/off the plurality of second inspection switches and connected between the gate electrode of each of the second inspection switches and a second electrode;
    a second plurality of wiring lines configured to connect between the source electrodes of the second inspection switches and a second plurality of pads to which an inspection signal is supplied; and
    a third wiring line configured to apply a signal to the counter-electrode and the storage capacitance lines.

2. The display device according to claim 1, wherein
    the first wiring line is connected to a first electrode configured to receive a signal to turn off the plurality of first inspection switches, and
    the second wiring line is connected to a second electrode configured to receive a signal to turn off the plurality of second inspection switches.

3. The display device according to claim 1, wherein
    the display device is a display device having a liquid crystal display panel including the display section, and
    the pixel electrode includes a reflective electrode.

* * * * *